United States Patent
Ashkar et al.

(10) Patent No.: US 10,955,901 B2
(45) Date of Patent: Mar. 23, 2021

(54) SAVING POWER IN THE COMMAND PROCESSOR USING QUEUE BASED WATERMARKS

(71) Applicant: Advanced Micro Devices, Inc., Sunnyvale, CA (US)

(72) Inventors: Alexander Fuad Ashkar, Winter Park, FL (US); Angel E. Socarras, Lake Mary, FL (US); Rex Eldon McCrary, Oviedo, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/721,109

(22) Filed: Sep. 29, 2017

(65) Prior Publication Data
US 2019/0101973 A1  Apr. 4, 2019

(51) Int. Cl.
| G06F 1/00 | (2006.01) |
| G06F 1/3234 | (2019.01) |
| G06F 1/324 | (2019.01) |
| G06F 1/3296 | (2019.01) |
| G06F 1/3287 | (2019.01) |
| G06F 1/3203 | (2019.01) |

(52) U.S. Cl.
CPC ............ *G06F 1/3243* (2013.01); *G06F 1/324* (2013.01); *G06F 1/3287* (2013.01); *G06F 1/3296* (2013.01); *G06F 1/3203* (2013.01)

(58) Field of Classification Search
CPC ...... G06F 1/3243; G06F 1/324; G06F 1/3287; G06F 1/3296
USPC ......................................................... 713/322
See application file for complete search history.

(56) References Cited

U.S. PATENT DOCUMENTS

| 4,980,836 A | 12/1990 | Carter et al. |
| 5,396,635 A | 3/1995 | Fung |
| 5,617,572 A | 4/1997 | Pearce et al. |
| 5,692,202 A | 11/1997 | Kardach et al. |
| 6,334,167 B1 | 12/2001 | Gerchman et al. |

(Continued)

OTHER PUBLICATIONS

Yuan et al., "Buffering Approach for Energy Saving in Video Sensors", 2003 International Conference on Multimedia and Expo, Jul. 2003, 4 pages.

(Continued)

*Primary Examiner* — Volvick Derose
(74) *Attorney, Agent, or Firm* — Kowert Hood Munyon Rankin and Goetzel PC; Rory D. Rankin

(57) ABSTRACT

Systems, apparatuses, and methods for dynamically adjusting the power consumption of prefetch engines are disclosed. In one embodiment, a processor includes one or more prefetch engines, a draw completion engine, and a queue in between the one or more prefetch engines and the draw completion engine. If the number of packets stored in the queue is greater than a high watermark, then the processor reduces the power state of the prefetch engine(s). By decreasing the power state of the prefetch engine(s), power consumption is reduced. Additionally, this power consumption reduction is achieved without affecting performance, since the queue has a high occupancy and the draw completion engine can continue to read packets out of the queue. If the number of packets stored in the queue is less than a low watermark, then the processor increases the power state of the prefetch engine(s).

17 Claims, 8 Drawing Sheets

(56) References Cited

U.S. PATENT DOCUMENTS

| | | |
|---|---|---|
| 6,657,634 B1 | 12/2003 | Sinclair et al. |
| 7,028,200 B2 | 4/2006 | Ma |
| 7,085,941 B2 | 8/2006 | Li |
| 7,428,644 B2 | 9/2008 | Jeddeloh et al. |
| 7,437,579 B2 | 10/2008 | Jeddeloh et al. |
| 7,496,777 B2 | 2/2009 | Kapil |
| 7,613,941 B2 | 11/2009 | Samson et al. |
| 7,743,267 B2 | 6/2010 | Snyder et al. |
| 7,800,621 B2 * | 9/2010 | Fry ...................... G06F 1/3225 345/531 |
| 7,802,060 B2 | 9/2010 | Hildebrand |
| 7,840,827 B2 | 11/2010 | Dahan et al. |
| 7,868,479 B2 | 1/2011 | Subramaniam |
| 7,873,850 B2 | 1/2011 | Cepulis |
| 7,899,990 B2 | 3/2011 | Moll |
| 8,181,046 B2 | 5/2012 | Marcu et al. |
| 8,402,232 B2 | 3/2013 | Avudaiyappan et al. |
| 8,656,198 B2 | 2/2014 | Branover et al. |
| 2001/0005367 A1 * | 6/2001 | Liu .................... H04L 12/5601 370/389 |
| 2002/0053038 A1 * | 5/2002 | Buyuktosunoglu ... G06F 1/3203 713/320 |
| 2004/0018849 A1 * | 1/2004 | Schiff ................. H04W 52/267 455/522 |
| 2006/0179186 A1 * | 8/2006 | Nye ......................... G06F 5/06 710/52 |
| 2008/0056290 A1 * | 3/2008 | Hegde .................... H04L 47/10 370/412 |
| 2009/0055496 A1 * | 2/2009 | Garg ...................... H04L 47/10 709/206 |
| 2009/0077395 A1 * | 3/2009 | Tsai ...................... G06F 1/3209 713/310 |
| 2009/0327506 A1 * | 12/2009 | Diab ....................... H04L 47/10 709/230 |
| 2010/0011198 A1 * | 1/2010 | Hooker ................. G06F 1/3203 713/1 |
| 2011/0113199 A1 * | 5/2011 | Tang .................... G06F 12/0862 711/130 |
| 2011/0247002 A1 * | 10/2011 | Salapura ............... G06F 9/5061 718/104 |
| 2013/0061236 A1 * | 3/2013 | Ghose .................. G06F 1/3203 718/104 |
| 2013/0080814 A1 * | 3/2013 | Cong .................... G06F 1/3206 713/340 |
| 2013/0318379 A1 * | 11/2013 | Seshadri ............... G06F 9/5094 713/320 |
| 2014/0013142 A1 * | 1/2014 | Kalaga .................. G06F 1/3234 713/323 |
| 2014/0181561 A1 * | 6/2014 | Shippy .................. G06F 1/3287 713/324 |
| 2014/0301198 A1 * | 10/2014 | Louzoun ................ H04L 47/29 370/235 |
| 2015/0143059 A1 * | 5/2015 | Goodman ........... G06F 12/0864 711/143 |
| 2017/0054782 A1 * | 2/2017 | Agarwal ................. H04L 67/06 |
| 2018/0132189 A1 * | 5/2018 | Sundararajan ........ H04W 52/50 |

OTHER PUBLICATIONS

"Intel Power Management Technologies for Processor Graphics, Display, and Memory: White Paper for 2010-2011 Desktop and Notebook Platforms", Intel Corporation, Aug. 2010, 10 pages.

* cited by examiner

| Application Type | High Watermark | Low Watermark |
|---|---|---|
| Type 435A | 80% | 20% |
| Type 435B | 90% | 10% |
| Type 435C | 75% | 25% |
| ... | ... | ... |

Table 400

FIG. 4

SAVING POWER IN THE COMMAND PROCESSOR USING QUEUE BASED WATERMARKS

BACKGROUND

Description of the Related Art

Many different applications are utilizing the powerful new graphics processors (e.g., graphics processing units (GPUs)) being developed. A graphics pipeline implemented in a graphics processor typically has a large number of stages. Some of the pipeline stages consume power at the same rate regardless of whether or not they are actually performing useful work. Accordingly, techniques for reducing the power consumption of graphics pipelines are desired without having an adverse affect on performance.

BRIEF DESCRIPTION OF THE DRAWINGS

The advantages of the methods and mechanisms described herein may be better understood by referring to the following description in conjunction with the accompanying drawings, in which:

FIG. 4 is a diagram of one embodiment of a table for determining how to program high and low watermarks based on a software application type.

DETAILED DESCRIPTION OF EMBODIMENTS

Figure 1:
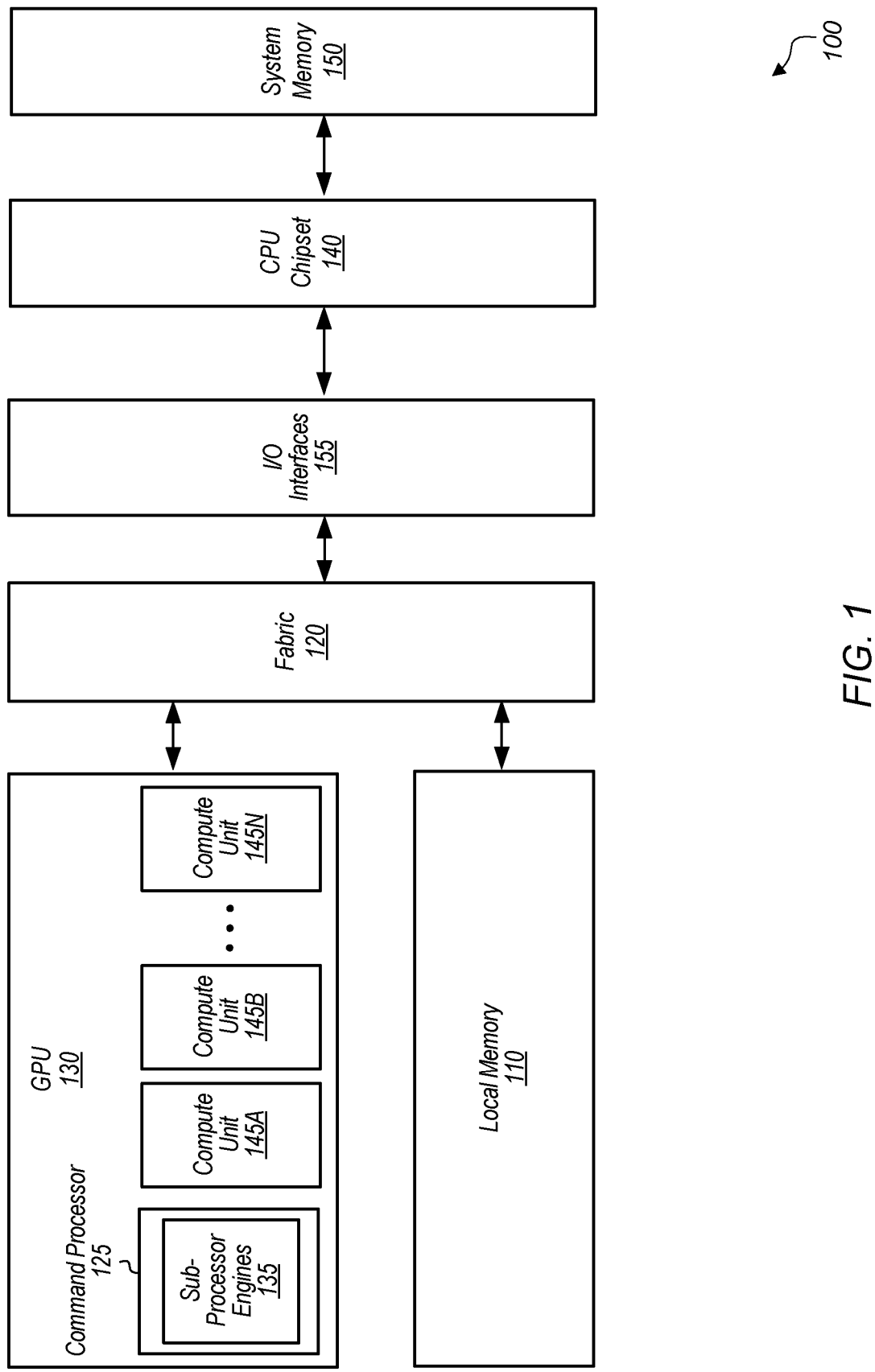
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for dynamically adjusting the power consumption of prefetch engines without impacting performance are disclosed herein. In one embodiment, a system includes at least a processor and a memory coupled to the processor. In one embodiment, the processor is a graphics processing unit (GPU). In other embodiments, the processor can be other types of processors (e.g., application specific integrated circuit (ASIC), field programmable gate array (FPGA), digital signal processor (DSP)).

In one embodiment, the processor includes one or more prefetch engines, a draw completion engine, and a queue in between the one or more prefetch engines and the draw completion engine. The processor is configured to determine if a number of packets stored in the queue is greater than a high watermark. If the number of packets stored in the queue is greater than the high watermark, then the processor is configured to operate the prefetch engine(s) at a lower power state. As used herein, the term "watermark" refers to a level or number that represents a threshold. For example, in a queue with N entries, a low watermark could be set at N/8 entries and a high watermark could be set at N/2. In some embodiments, such a watermark is programmable and may be expressed in various ways. For example, a watermark could be expressed as a single value (e.g., "8") which could represent a number of entries, a fractional value (e.g., "8" could mean ⅛, 8%, or otherwise). These and other embodiments are possible and are contemplated. Depending on the embodiment, operating the prefetch engine(s) at a lower power state can include power-gating the prefetch engine(s), decreasing a frequency of a clock supplied to the prefetch engine(s), and/or other actions. By decreasing the power state of the prefetch engine(s), the power consumption of the prefetch engine(s) and thus the processor as a whole is reduced. Additionally, this power consumption reduction is achieved without affecting performance, since the queue has a high occupancy and the draw completion engine can continue to process packets out of the queue. Generally speaking, "occupancy" (or an "occupancy level") refers to how much of the storage device or data structure is occupied. For example, a queue may have N entries configured to store data. If the number of entries occupied by valid data approaches N, then the occupancy of the queue may be considered high. Conversely, if few entries of the queue are currently occupied with valid data (e.g., less than 10%), then the occupancy of the queue may be considered low.

In one embodiment, if the processor detects that the number of packets in the queue is less than a low watermark, then the processor is configured to operate the prefetch engine(s) at a higher power state. When the occupancy of the queue is low, this means the draw completion engine is close to being starved of packets to process. To prevent this from happening, the power state of the prefetch engine(s) is increased, enabling the prefetch engine(s) to fill up the queue with packets. In various embodiments, the high and low watermarks are programmable. The low watermark can be programmed to ensure that the occupancy of the queue does not get too low before the prefetch engine(s) are ramped up. Similarly, the high watermark can be set to ensure that the queue does not become fully occupied while the prefetch engine(s) continue to burn power at a relatively high rate even though the prefetch engine(s) are unable to write packets into the queue since the queue is full or nearly full. In another embodiment, the processor monitors the occupancy of the queue and then calculates a prefetch engine clock frequency based on the occupancy of the queue. For example, in one embodiment, the prefetch engine clock frequency is programmed to be inversely proportional to the occupancy of the queue.

Referring now to FIG. 1, a block diagram of one embodiment of a computing system 100 is shown. In one embodiment, computing system 100 includes a system memory 150, input/output (I/O) interfaces 155, fabric 120, graphics processing unit (GPU) 130, local memory 110, and central processing unit (CPU) Chipset 140. System 100 can also include other components not shown in FIG. 1 to avoid obscuring the figure. In another embodiment, GPU 130 can be another type of processing unit (e.g., application specific integrated circuit (ASIC), field programmable gate array (FPGA), digital signal processor (DSP)). Additionally, it should be understood that other types of computing systems with different structures and/or containing other components can be utilized to implement the various methods and mechanisms described herein.

GPU 130 includes at least command processor 125 and compute units 145A-N which are representative of any number and type of compute units that are used for graphics or general-purpose processing. Each compute unit 145A-N includes any number of execution units, with the number of execution units varying from embodiment to embodiment. Command processor 125 includes a plurality of sub-processor engines 135. For example, in one embodiment, sub-processor engines 135 include a constant engine, a prefetch parser engine, and a draw completion engine. In one embodiment, the completion engine and the prefetch parser engine write packets into a queue, and the packets are processed out of the queue by the draw completion engine. In other embodiments, sub-processor engines 135 can include other numbers and types of components.

GPU 130 is coupled to local memory 110 via fabric 120. In one embodiment, local memory 110 is implemented using high-bandwidth memory (HBM). In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

In one embodiment, GPU 130 is configured to determine if the occupancy of the queue in between the prefetch parser engine and the draw completion engine is above a high watermark or below a low watermark. If the queue occupancy is above the high watermark, then GPU 130 power-gates or otherwise reduces the power consumption of the prefetch parser engine. If the queue occupancy is below the low watermark, then GPU 130 increase the power state of the prefetch parser engine. The watermarks allow GPU 130 to ensure the draw completion engine has a steady supply of packets while also reducing power consumption when the draw completion engine is not able to keep up with the packets generated by the prefetch parser engine.

I/O interfaces 155 are coupled to fabric 120, and I/O interfaces 155 are representative of any number and type of interfaces (e.g., PCI bus, PCI-Extended (PCI-X), PCIE (PCI Express) bus, gigabit Ethernet (GBE) bus, universal serial bus (USB)). CPU chipset 140 is coupled to system memory 150, which includes one or more memory modules. Each of the memory modules includes one or more memory devices mounted thereon. In some embodiments, system memory 150 includes one or more memory devices mounted on a motherboard or other carrier upon which GPU 130 and/or other components are also mounted.

In various embodiments, computing system 100 can be a computer, laptop, mobile device, server or any of various other types of computing systems or devices. It is noted that the number of components of computing system 100 and/or GPU 130 can vary from embodiment to embodiment. There can be more or fewer of each component/subcomponent than the number shown in FIG. 1. It is also noted that computing system 100 and/or GPU 130 can include other components not shown in FIG. 1. Additionally, in other embodiments, computing system 100 and GPU 130 can be structured in other ways than shown in FIG. 1.

Figure 2:
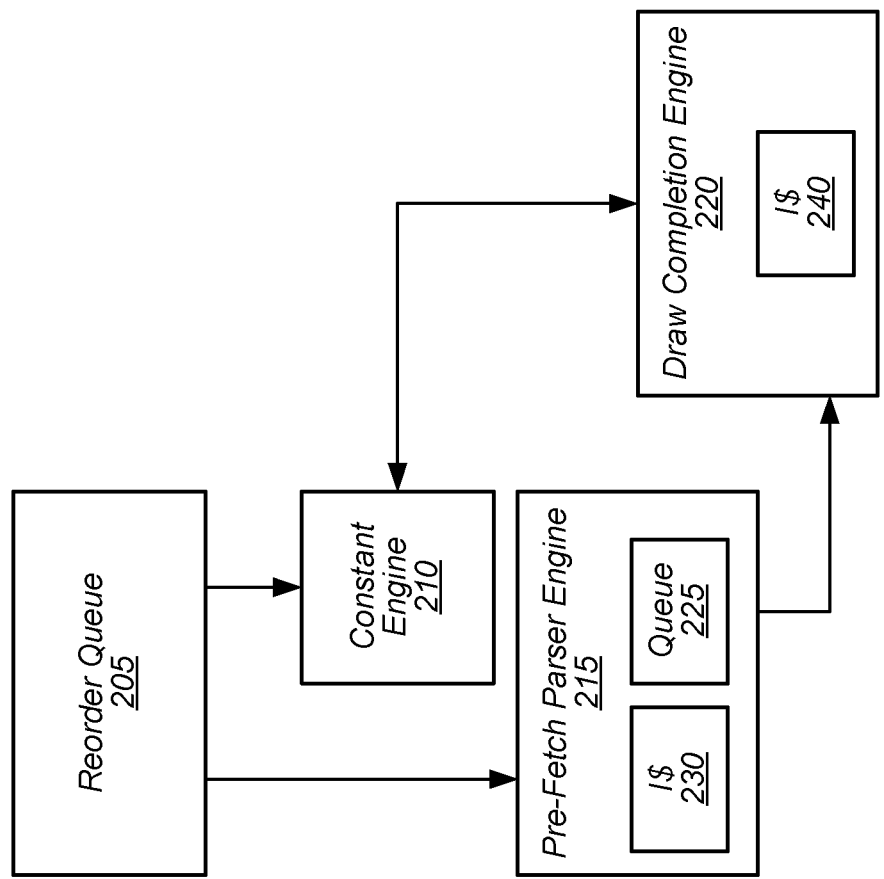
FIG. 2 is a block diagram of one embodiment of command processor logic.

Turning now to FIG. 2, a block diagram of one embodiment of command processor logic 200 is shown. Command processor logic 200 includes reorder queue 205, constant engine 210, pre-fetch parser engine 215, and draw completion engine 220. Pre-fetch parser engine 215 includes instruction cache (I$) 230 and draw completion engine 220 includes instruction cache 240 for caching instructions. Although not shown in FIG. 2, other cache levels can also be located at other locations within command processor logic 200. It is noted that command processor logic 200 can also include other components and/or logic which are not shown in FIG. 2 to avoid obscuring the figure.

Unparsed command processor packets come back out of order from cache or memory and are stored in reorder queue 205. Pre-fetch parser engine 215 is configured to perform latency hiding functions to assist draw completion engine 220 by prefetching data and/or setting up data out of reorder queue 205. For example, pre-fetch parser engine 215 is configured to fetch state commands, draw commands, dispatch commands and/or other types of commands from cache or memory. Pre-fetch parser engine 215 is configured to process and parse the retrieved commands, and then store state updates, draw packets, dispatch packets, and/or other types of packets into queue 225. Draw completion engine 220 is configured to process the state update, dispatch, and draw packets. For example, draw completion engine 220 issues draw packets to draw initiators which perform various rendering tasks.

Between the pre-fetch parser engine 215 and the draw completion engine 220 is a queue 225 which stores pre-processed packets so as to hide latency from draw completion engine 220. The size of queue 225 can vary from embodiment to embodiment. In one embodiment, the size of queue 225 is specifies as a number of double words (dwords), where a dword equals four bytes or 32 bits. Queue 225 includes programmable watermarks to indicate high and low occupancy levels of queue 225. When the occupancy of queue 225 reaches the high watermark, this indicates that the prefetch engines (e.g., pre-fetch parser engine 215 and constant engine 210) are getting too far ahead of draw completion engine 220. When the number of packets in queue 225 reaches the high watermark, the prefetch engines can be clock-gated, power-gated, powered down, or otherwise have their power state reduced. This allows command processor 200 to reduce overall power consumption without impacting performance, when the prefetch engines are unable to make progress because queue 225 is full or nearly full.

For example, in one embodiment, when the number of packets in queue 225 reaches the high watermark, the clock rate supplied to the prefetch engines is reduced. After the clock rate of the prefetch engines is reduced, packets will be drained ("processed") out of queue 225 by draw completion engine 220 and the occupancy of the queue 225 may decline. When the number of packets in the queue 225 reaches the low watermark, the clock rate supplied to the prefetch engines will be increased, which will cause queue 225 to be refilled. This process can continue and will result in queue 225 neither becoming full or empty. This allows draw completion engine 220 to continuously have packets available to be processed while also reducing the power consumption of the prefetch engines.

In one embodiment, the high and low watermarks of queue 225 are programmable. For example, in one embodiment, the high and low watermarks can be programmed based on the application that is running. Alternatively, the high and low watermarks can be programmed based on a power consumption setting and/or a performance setting.

Figure 3:
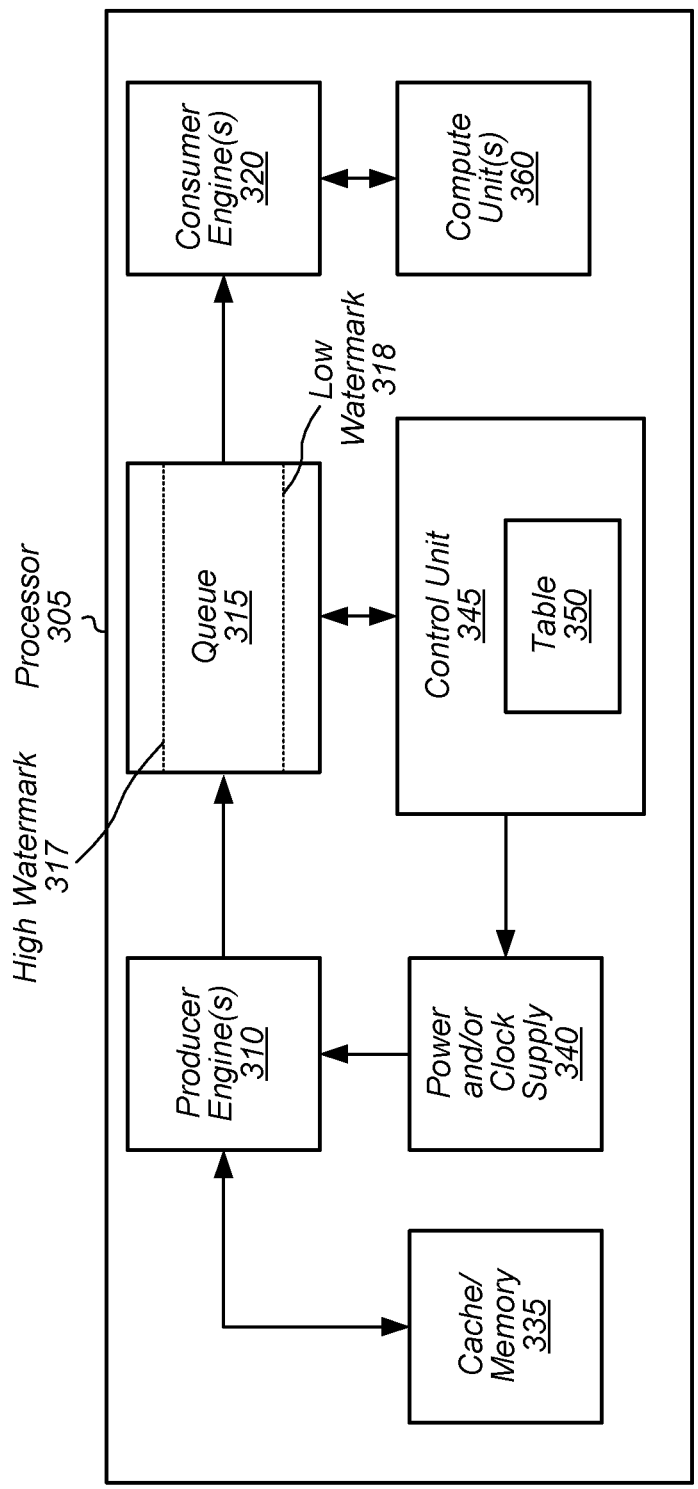
FIG. 3 is a block diagram of one embodiment of a processor.

Referring now to FIG. 3, a block diagram of one embodiment of a processor 305 is shown. In one embodiment, processor 305 includes producer engine(s) 310, queue 315, consumer engine 320, cache/memory 335, power and/or clock supply 340, control unit 345, and compute unit(s) 360. In other embodiments, processor 305 can include other components not shown in FIG. 3 to avoid obscuring the figure. In one embodiment, processor 305 is a GPU. In other embodiments, processor 305 is any of various other types of processors (e.g., FPGA, ASIC, DSP, CPU).

In one embodiment, producer engine(s) 310 include any number of engines which are configured to retrieve various packets from cache/memory 335 and store the packets in queue 315. In one embodiment, producer engine(s) 310 include a constant engine and a pre-fetch parser engine. In other embodiments, producer engine(s) 310 can include other numbers and types of units. Queue 315 is representative of any type and size of structure for storing packets which have been fetched and pre-processed by producer engine(s) 310. Consumer engine(s) 320 are configured to pop and process packets out of queue 315 and then issue corresponding calls to compute unit(s) 360. In one embodiment, consumer engine(s) 320 include a draw completion engine which processes packets out of queue 315 and issues draw calls, dispatch calls, and state updates to compute unit(s) 360. Compute unit(s) 360 are representative of any number and type of execution units for executing instructions.

Control unit 345 is configured to monitor the occupancy of queue 315 and adjust the power and/or clock supply 340 to producer engine(s) 310 based on the occupancy of queue 315. Control unit 345 can be implemented using any suitable combination of software and/or hardware. In one embodiment, control unit 345 determines if the occupancy of queue 315 is greater than the high watermark 317 or less than the low watermark 318. In this embodiment, if the occupancy of queue 315 is greater than the high watermark 317, then control unit 345 reduces the power and/or the frequency of the clock(s) supplied to producer engine(s) 310. As used herein, the term "reducing the power state" is defined as reducing the power and/or the frequency of the clock supplied to producer engine(s) 310. When control unit 345 reduces the power state of producer engine(s) 310, this results in a reduction in the power consumption of producer engine(s) 310. When queue 315 has an occupancy greater than high watermark 317, this will not affect the performance of processor 305 since consumer engine(s) 320 will still be able to retrieve packets out of queue 315 and process these packets. When the occupancy of queue 315 falls below low watermark 318, then control unit 345 increases the power state of producer engine(s) 310 by increasing the output(s) of power and/or clock supply 340.

In another embodiment, control unit 345 monitors the occupancy of queue 315 and sets the power and/or clock supply 340 based on the occupancy of queue 315. In this embodiment, control unit 345 can set the power state of producer engine(s) 310 to be inversely proportional to the occupancy of queue 315. For example, if queue 315 is 90% occupied, then control unit 345 can set the power state(s) of producer engine(s) 310 to be at 10% of the maximum power state. Alternatively, if queue 315 is 10% occupied, then control unit 345 can set the power state(s) of producer engine(s) 310 to be at 90% of the maximum power state.

Control unit 345 is configured to program the values for high watermark 317 and low watermark 318. In one embodiment, control unit 345 includes table 350 for determining how to program high watermark 317 and low watermark 318. For example, table 350 can include entries for different software applications, with different high and low watermarks for each application or each type of application expected to be running on processor 305. One example of a table 350 which can be utilized is shown as table 400 in FIG. 4. In another embodiment, control unit 345 can program low watermark 318 based on the rate at which consumer engine(s) 320 process packets out of queue 315. For example, the control unit 345 (or another unit) may be configured to monitor such a rate, maintain and dynamically adjust the watermarks based on the observed rate. In some embodiments, monitoring may include maintaining a history associated with various processes or entities. Based on such a history, predictions regarding anticipated rate increases or decreases may be made and the watermarks adjusted accordingly. In various embodiments, control unit 345 can program low watermark 318 based on the amount of time it will take for consumer engine(s) 320 to process packets out of queue 315. This can ensure that there is enough margin in queue 315 so that producer engine(s) 310 will be able to refill queue 315 before queue 315 is empty and consumer engine(s) 320 are starved for work.

Turning now to FIG. 4, one embodiment of a table 400 for determining how to program high and low watermarks based on a software application type is shown. Table 400 is one example of a table for determining how to program high and low watermark values for a queue (e.g., queue 315 of FIG. 3) utilized for storing packets for processing by one or more consumer engines (e.g., consumer engine(s) 320). In one embodiment, table 400 is stored in a cache or memory within or coupled to a processor (e.g., processor 305).

In one embodiment, when the processor executes a given application, the processor retrieves table 400 and performs a lookup of table 400 to determine how to program watermarks for monitoring the occupancy of a queue in between producer engine(s) and consumer engine(s). For example, when the processor is executing an application of type 435A, the processor programs a high watermark for 80% of queue occupancy and a low watermark for 20% of queue occupancy. Alternatively, if the processor is executing an application of type 435B, the processor programs a high watermark for 90% of queue occupancy and a low watermark for 10% of queue occupancy. Still further, if the processor is executing an application of type 435C, the processor programs a high watermark for 75% of queue occupancy and a low watermark for 25% of queue occupancy. It is noted that table 400 can include any number of other entries specifying desired high and low watermark levels for other types of applications.

In one embodiment, the processor executes a testing phase with different types of applications to determine how fast the producer engine(s) write packets into the queue and how fast and the consumer engine(s) read packets out of the queue. Based on the testing phase, the processor determines the optimal high and low watermark settings which will balance performance and power consumption. In one embodiment, the processor sets the high and low watermarks to minimize power consumption while still achieving a specified performance target. In another embodiment, the processor monitors the rate at which the consumer engine(s) are processing packets out of the queue. Based on the rate, the processor programs the high and low watermarks to make sure there is enough margin of error so that the consumer engine(s) will have packets to process while also making sure the power consumed by the prefetch engine(s) is actually being used for productive tasks.

Figure 5:
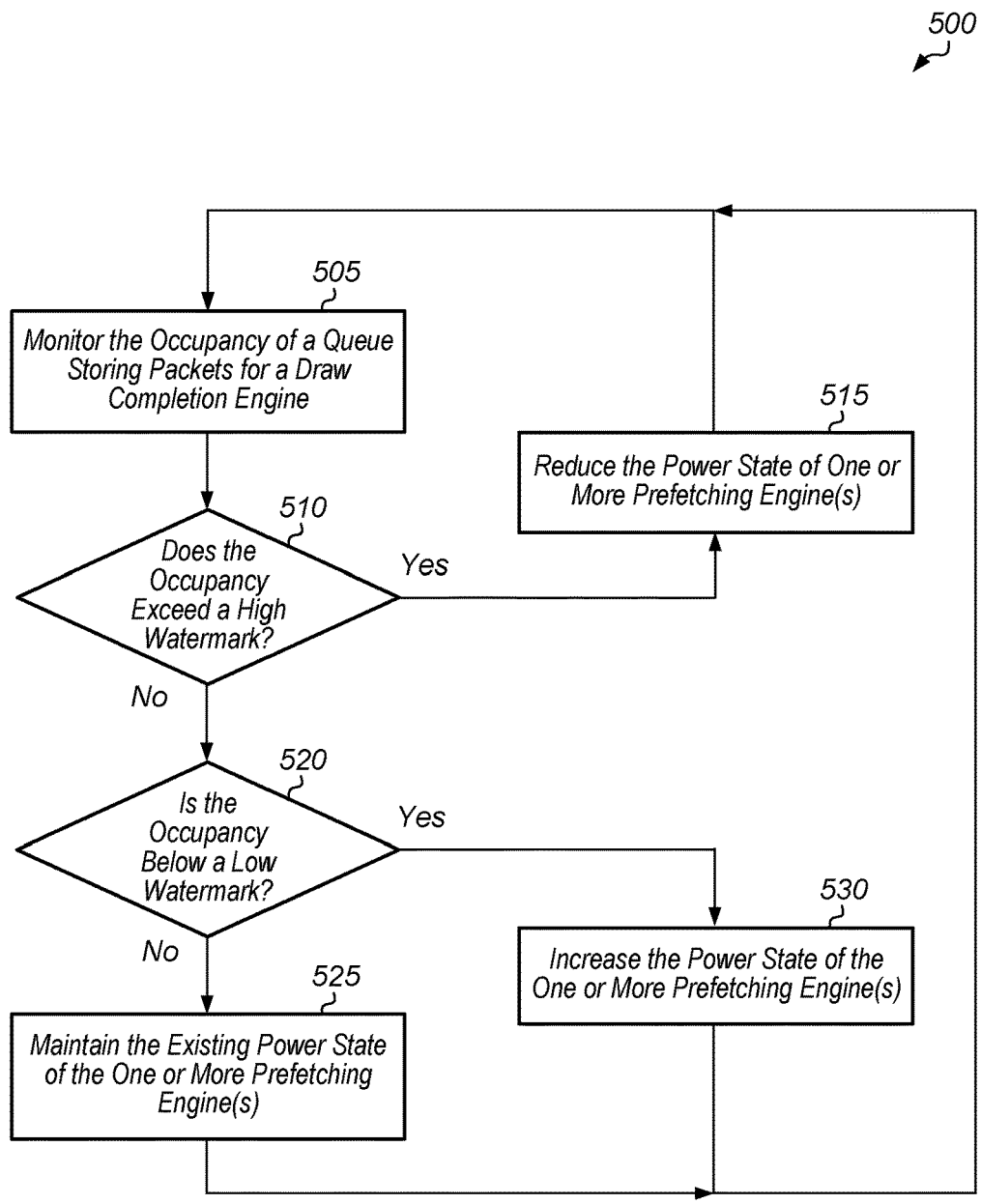
FIG. 5 is a generalized flow diagram illustrating one embodiment of a method for dynamically adjusting the power states of prefetch engines.
Figure 6:
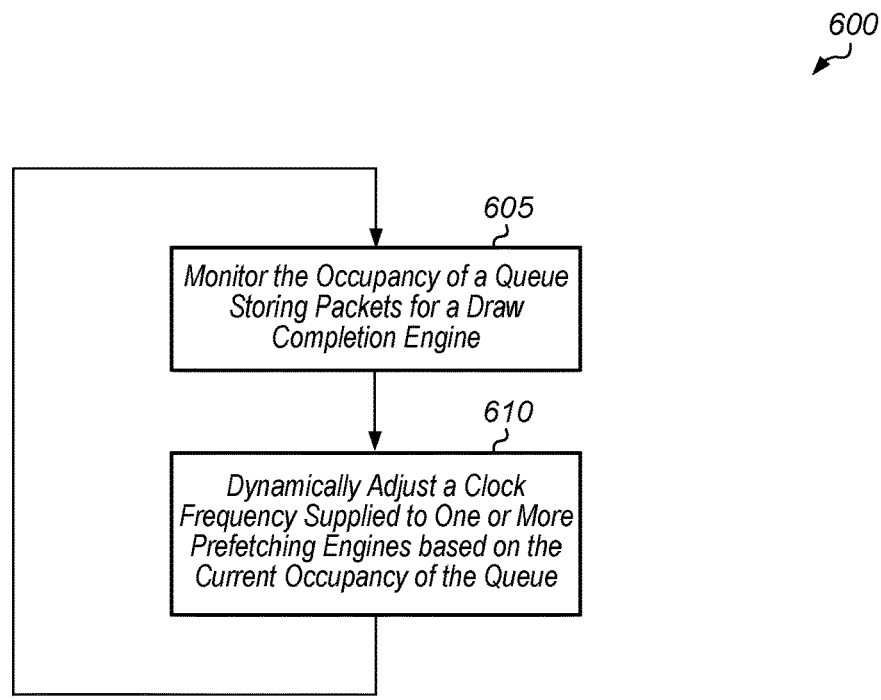
FIG. 6 is a generalized flow diagram illustrating another embodiment of a method for dynamically adjusting the power states of prefetch engines.
Figure 7:
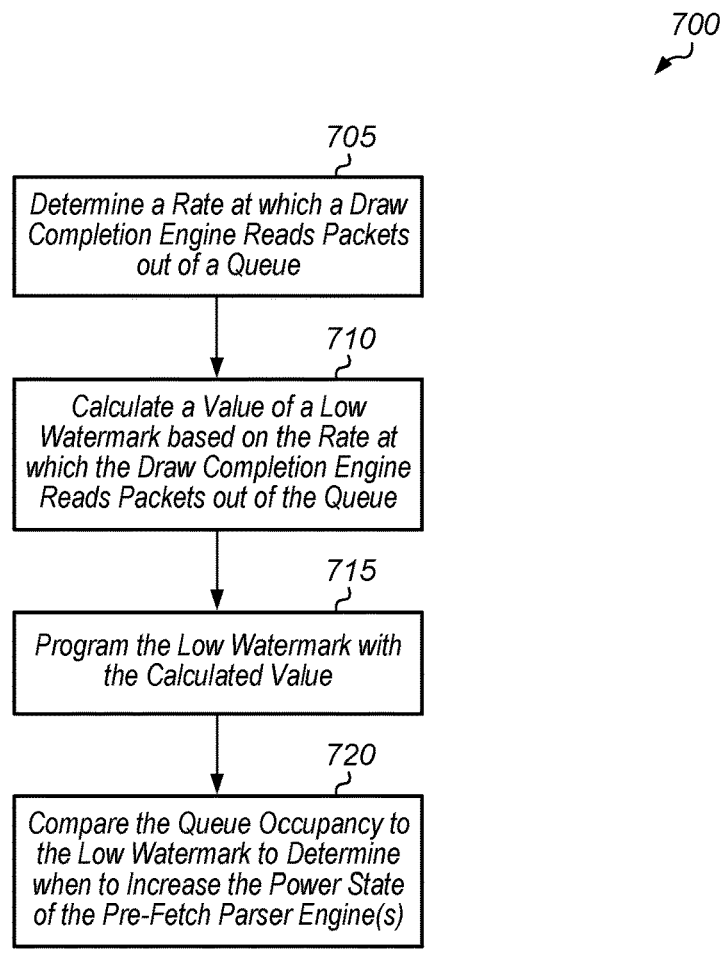
FIG. 7 is a generalized flow diagram illustrating another embodiment of a method for programming a low watermark for a queue.
Figure 8:
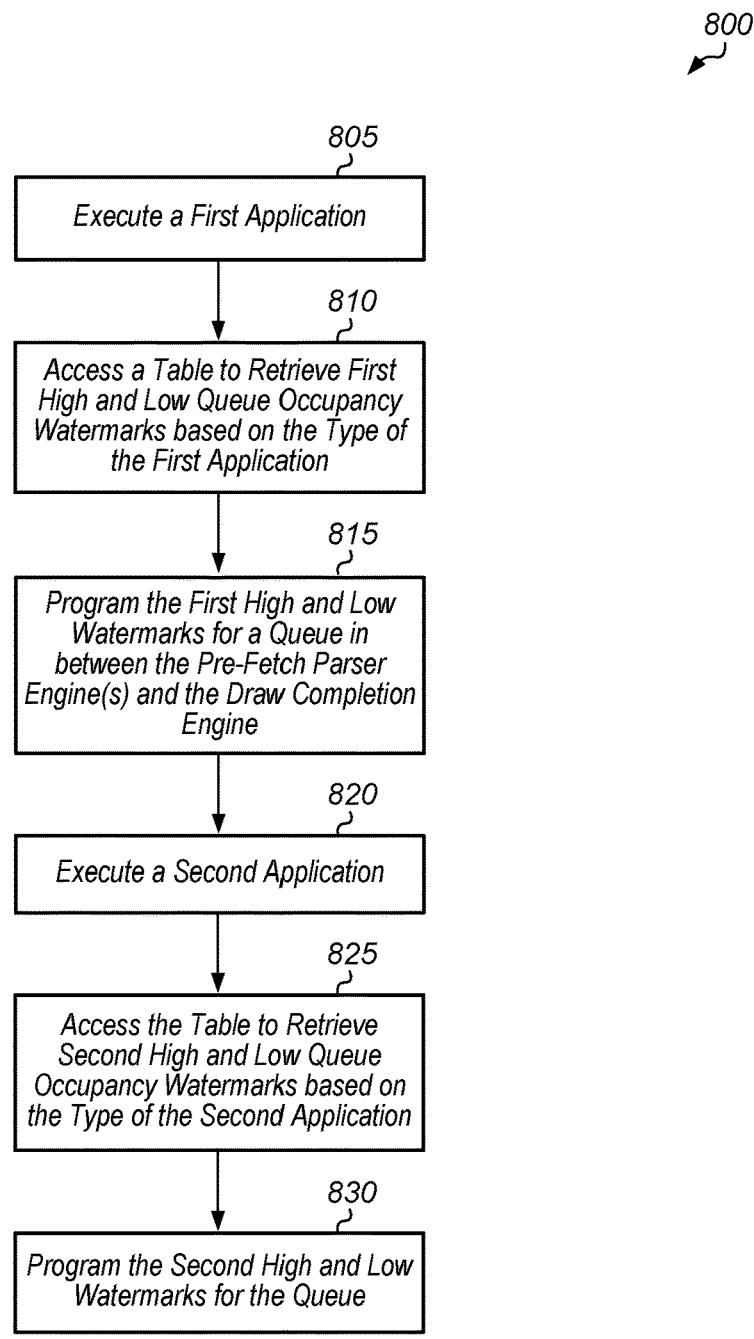
FIG. 8 is a generalized flow diagram illustrating another embodiment of a method for programming queue occupancy watermarks based on an application being executed.

Turning now to FIG. 5, one embodiment of a method 500 for dynamically adjusting the power states of prefetch engines is shown. For purposes of discussion, the steps in this embodiment and those of FIG. 6-8 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A control unit (e.g., control unit 345 of FIG. 3) monitors the occupancy of a queue storing packets for a draw completion engine (block 505). If the occupancy exceeds a high watermark (conditional block 510, "yes" leg), then the system reduces the power state of one or more prefetch engines (block 515). In one embodiment, the control unit reduces the frequency of the clock supplied to the prefetch engine(s). In another embodiment, the control unit power-gates the prefetch engine(s). In other embodiments, the control unit utilizes other techniques to reduce the power consumption of the prefetch engine(s). After block 515, method 500 returns to block 505 with the control unit continuing to monitor the occupancy of the queue feeding the draw completion engine.

If the queue occupancy level is below the high watermark (conditional block 510, "no" leg), then the control unit determines if the occupancy has fallen below a low watermark (conditional block 520). If the queue occupancy level has fallen below the low watermark (conditional block 520, "yes" leg), then the control unit increases the power state of the one or more prefetch engines (block 525). Depending on the embodiment, different techniques can be utilized to increase the power state of the one or more prefetch engines. For example, if the one or more prefetch engines were previously power-gated, power can be restored to the prefetch engines. If the clock frequency had been reduced, then the clock frequency can be increased. Other techniques for increasing the power state of the prefetch engines can be utilized in other embodiments.

By increasing the power state of the one or more prefetch engines, the number of packets stored in the queue will increase, and the draw completion engine will not stall for lack of packets. After block 525, method 500 returns to block 505 with the control unit continuing to monitor the occupancy of the queue feeding the draw completion engine. If the queue occupancy level is above the low watermark (conditional block 520, "no" leg), then the control unit maintains the existing power state of the one or more prefetch engines (block 530). After block 530, method 500 returns to block 505 with the control unit continuing to monitor the occupancy of the queue in front of the draw completion engine.

Turning now to FIG. 6, another embodiment of a method 600 for dynamically adjusting the power state of one or more prefetch engines is shown. A control unit monitors the occupancy of a queue storing packets for a draw completion engine (block 605). The control unit dynamically adjusts a clock frequency supplied to one or more prefetch engines based on the current occupancy of the queue (block 610). In one embodiment, the clock frequency is adjusted in inverse proportion to the occupancy of the queue. For example, as the queue occupancy increases, the clock frequency is decreased. Also, as the queue occupancy decreases, the clock frequency is increased. It is assumed for the purposes of this discussion that the prefetch engine(s) have a different clock domain from the draw completion engine. Accordingly, when the clock frequency supplied to the prefetch engine(s) is adjusted, the clock frequency supplied to the draw completion engine can remain unchanged. After block 610, method 600 returns to block 605 to continue monitoring the occupancy of the queue.

Referring now to FIG. 7, one embodiment of a method 700 for programming a low watermark for a queue is shown. A control unit of a processor (e.g., GPU 130 of FIG. 1) determines a rate at which a draw completion engine reads packets out of queue (e.g., queue 225 of FIG. 2) (block 705). Next, the processor calculates a value of a low watermark based on the rate at which the draw completion engine reads packets out of the queue (block 710). For example, in one embodiment, the processor determines an amount of time that it requires to restart or ramp up the power state of the pre-fetch parser engines feeding the queue. The processor then multiples this amount of time by the rate at which the draw completion engine processes packets out of the queue. The resultant product is then an amount of data that would be processed by the processor in that amount of time, and this product can be used as the value of the low watermark. In other embodiments, the processor can utilize other suitable techniques for calculating a value of a low watermark based on the rate at which the draw completion engine processes packets out of the queue.

Next, the processor programs the low watermark with the calculated value (block 715). Then, the processor compares the queue occupancy to the low watermark to determine when to increase the power state of the pre-fetch parser engine(s) (block 720). After block 720, method 700 ends. It is noted that method 700 can be executed periodically to determine if the rate at which the draw completion engine is processing packets out of the queue has changed. If the rate at which the draw completion engine is processing packets out of the queue has changed, then the processor can calculate a new low watermark for the queue and use this low watermark for subsequent checks of the queue occupancy.

Turning now to FIG. 8, one embodiment of a method 800 for programming queue occupancy watermarks based on an application being executed is shown. A processor executes a first application (block 805). The processor accesses a table (e.g., table 400 of FIG. 4) to retrieve high and low queue occupancy watermarks based on the type of the first application (block 810). Then, the processor programs the high and low watermarks for a queue in between the pre-fetch parser engine(s) and the draw completion engine (block 815). At a later point in time, the processor executes a second application (block 820). The processor accesses the table to retrieve a second high watermark and a second low watermark for the second application (block 825). It is assumed for the purposes of this discussion that the second high watermark is different from the first high watermark and that the second low watermark is different from the first low watermark. Then, the processor programs the second high watermark and the second low watermark for the queue (block 830). After block 830, method 800 ends. It is noted that in other embodiments, other numbers of applications can be executed by the processor, and each application can utilize different values for the high and low watermarks for the queue in between the pre-fetch parser engine(s) and the draw completion engine.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a queue;
   one or more prefetch engines configured to write packets into the queue; and
   a draw completion engine configured to read packets out of the queue;
   wherein the system is configured to:
      program a low watermark based on a rate at which the draw completion engine reads packets out of the queue;
      monitor an occupancy of the queue;
      dynamically adjust a clock rate of the one or more prefetch engines based on the occupancy of the queue; and
      reduce a power state of the one or more prefetch engines while the power state for the draw completion engine remains unchanged, responsive to determining that the occupancy of the queue is greater than a high watermark.

2. The system as recited in claim 1, wherein the system is configured to increase the power state of the one or more prefetch engines while the power state for the draw completion engine remains unchanged responsive to determining that the occupancy of the queue is less than a low watermark.

3. The system as recited in claim 1, wherein the one or more prefetch engines have a different power supply from the draw completion engine.

4. The system as recited in claim 1, wherein the one or more prefetch engines have a different clock domain from the draw completion engine.

5. The system as recited in claim 1, wherein the clock rate of the one or more prefetch engines is adjusted in inverse proportion to the occupancy of the queue.

6. The system as recited in claim 1, further comprising a data structure configured to associate an application type with a corresponding high watermark and a corresponding low watermark, wherein in response to executing a given application, the system is configured to:
   access the data structure;
   identify watermarks corresponding to the given application; and
   program the queue using the watermarks.

7. A method comprising:
   writing packets, by one or more prefetch engines, into a queue;
   reading packets, by a draw completion engine, out of the queue;
   programming, by a control unit, a low watermark based on a rate at which the draw completion engine reads packets out of the queue;
   monitoring, by the control unit, an occupancy of the queue;
   dynamically adjusting a clock rate of the one or more prefetch engines based on the occupancy of the queue; and
   reducing, by the control unit, a power state of one or more prefetch engines while the power state for the draw completion engine remains unchanged responsive to determining that the occupancy of the queue is greater than a high watermark.

8. The method as recited in claim 7, further comprising increasing the power state of the one or more prefetch engines while the power state for the draw completion engine remains unchanged responsive to determining that the occupancy of the queue is less than a low watermark.

9. The method as recited in claim 7, wherein the one or more prefetch engines have a different power supply from the draw completion engine.

10. The method as recited in claim 7, wherein the one or more prefetch engines have a different clock domain from the draw completion engine.

11. The method as recited in claim 7, further comprising adjusting the clock rate of the one or more prefetch engines in inverse proportion to the occupancy of the queue.

12. The method as recited in claim 7, further comprising:
    associating, by a data structure, an application type with a corresponding high watermark and a corresponding low watermark;
    in response to executing a given application:
       accessing the data structure;
       identifying watermarks corresponding to the given application; and
       programming the queue using the watermarks.

13. An apparatus comprising:
    a queue;
    one or more prefetch engines comprising circuitry configured to write packets into the queue; and
    a draw completion engine different from the one or more prefetch engines comprising circuitry configured to read packets out of the queue;
    wherein the apparatus is configured to:
       program a low watermark based on a rate at which the draw completion engine reads packets out of the queue;
       monitor an occupancy of the queue;
       dynamically adjust a clock rate of the one or more prefetch engines based on the occupancy of the queue; and
       reduce a power state of the one or more prefetch engines while the power state for the draw completion engine remains unchanged responsive to determining that the occupancy of the queue is greater than a high watermark.

14. The apparatus as recited in claim 13, wherein the apparatus is configured to increase the power state of the one or more prefetch engines while the power state for the draw completion engine remains unchanged responsive to determining that the occupancy of the queue is less than a low watermark.

15. The apparatus as recited in claim 13, wherein the one or more prefetch engines have a different power supply from the draw completion engine.

16. The apparatus as recited in claim 13, wherein the one or more prefetch engines have a different clock domain from the draw completion engine.

17. The apparatus as recited in claim 13, wherein the clock rate of the one or more prefetch engines is adjusted in inverse proportion to the occupancy of the queue.

* * * * *